J. C. HILTON.
CORN POPPING DEVICE AND ATTACHMENT THEREFOR.
APPLICATION FILED APR. 8, 1911.
1,032,212.
Patented July 9, 1912.
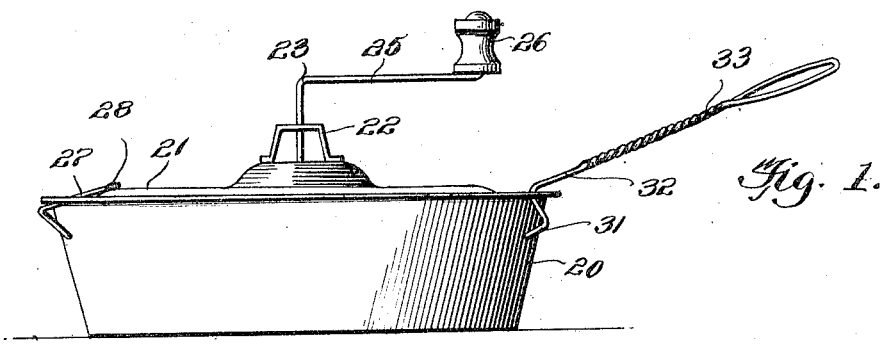
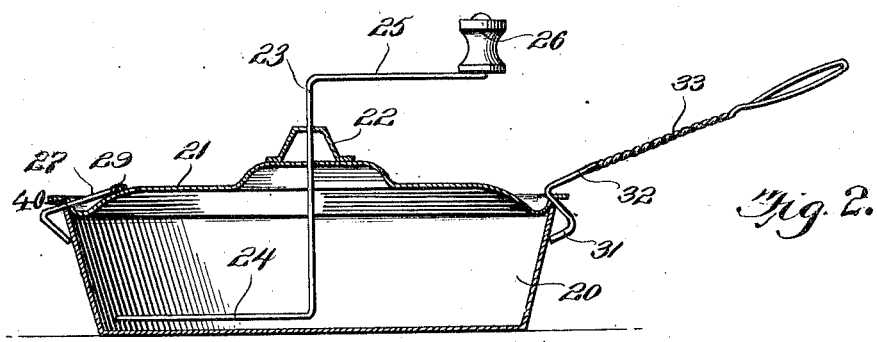
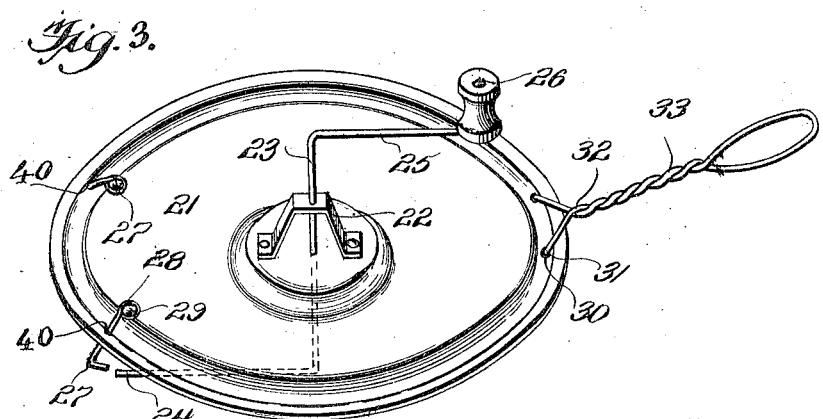
Inventor
James C. Hilton.
Witnesses
By Victor J. Evans
Attorney

UNITED STATES PATENT OFFICE.

JAMES C. HILTON, OF WEBB CITY, MISSOURI.

CORN-POPPING DEVICE AND ATTACHMENT THEREFOR.

1,032,212.　　　　Specification of Letters Patent.　　Patented July 9, 1912.

Application filed April 8, 1911.　Serial No. 619,807.

*To all whom it may concern:*

Be it known that I, JAMES C. HILTON, a citizen of the United States, residing at Webb City, in the county of Jasper and State of Missouri, have invented new and useful Improvements in Corn-Popping Devices and Attachments Therefor, of which the following is a specification.

The invention relates to corn popping devices, and more particularly to the class of corn popping attachments for cooking utensils, receptacles, or the like.

The primary object of the invention is the provision of an attachment in which the corn to be popped may be conveniently and properly agitated, so as to prevent the scorching or burning thereof during the popping process.

Another object of the invention is the provision of an attachment of this character in which corn, in the popping process, will be prevented from splattering or popping from the utensil, vessel or the like during the roasting thereof, thus avoiding the loss of the popcorn while cooking.

A further object of the invention is the provision of an attachment of this character which is simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of a cooking vessel or utensil, showing a popping attachment applied thereto. Fig. 2 is a vertical longitudinal sectional view thereof. Fig. 3 is a perspective view of the lid or cover of the attachment removed from the utensil.

Similar reference characters indicate corresponding parts throughout the several views of the drawings.

Referring to the drawings by numerals there is shown an ordinary frying skillet 20, on which is mounted a corn popping attachment, the same comprising a lid or cover 21 adapted to fit upon the skillet, so as to prevent the popping of the corn therefrom during the popping process. Rising from the top of this cover or lid 21, centrally thereof, is an upwardly arched strip or bridge piece 22, the latter containing a central opening, alining with the central opening in the said lid or cover 21, and through these openings is passed a vertical stem 23, the lower end of which is bent at right angles to form a stirring or agitator arm 24, while the opposite outer end is also bent at right angles to form a crank 25, carrying a hand knob 26. Thus, on the turning of the latter, the stem may be rotated, with its arm 24, for agitating or stirring the corn contained within the skillet, during the popping process.

Provided in the lid or cover 21, contiguous to its periphery, are spaced openings 40, through which are passed hook-like catches 27, the same being adapted to engage the outer face of the side wall of the skillet for retaining the lid or cover thereon. The catches 27 are formed with eyes 28, through which are passed rivets 29, the same being secured in the lid or cover 21. Thus, in this manner, the catches are held fast thereon.

Diametrically opposite the catches 27 and formed in the lid or cover 21 are spaced openings 30, through which are passed the hook-like terminals 31 of a bail 32, the same being formed with a twisted handle extension 33, the hook-like terminals 31 serving as catches to engage the outer face of the side wall of the skillet when the handle 33 is pressed downwardly in the direction of the skillet handle, thus securing the lid or cover 21 on the said skillet. It will be apparent that by pulling upwardly on the handle 33 of the bail 32, the hook-like terminals 31 of the latter will be retracted from their engagement with the side wall of the skillet 20, thereby permitting the lid or cover 21 to be removed from the same.

What is claimed is:

1. In combination with a vessel, a cover, hook-like catches secured adjacent the periphery of the cover and adapted to engage the side walls of the vessel, said cover having openings formed in the periphery of the cover diametrically opposite the hook-like catches, a bail having on one end hook-like extensions adapted to pass through the openings in the cover, the opposite end of the bail terminating in a handle, the same when pressed downwardly securing the cover to the vessel.

2. The combination with a vessel, of a cover, having spaced openings formed adjacent the periphery thereof, hook-like catches passed through said openings, said catches having eyes, rivets passed through the eyes and the cover for securing the catches thereto, said cover being provided with spaced openings formed in the lid diametrically opposite the catches, a bail having hook-like terminals adapted to be passed through the last mentioned spaced openings so as to engage the sides of the vessel when downward pressure is exerted upon the bail handle.

In testimony whereof I affix my signature in presence of two witnesses.

JAMES C. HILTON.

Witnesses:
 WHITSON B. KIRK,
 STREATOR J. MCKNIGHT.